United States Patent Office 3,293,054
Patented Dec. 20, 1966

3,293,054
ADHESIVE COMPOSITION
Paul F. Lennox, Weston, Mass., and John B. Kirkland, Baltimore, Md., assignors to The Webtex Company, Wilmington, Mass., a voluntary association of Massachusetts
No Drawing. Filed Aug. 13, 1963, Ser. No. 301,882
2 Claims. (Cl. 106—123)

The present invention relates to new adhesive compositions and more particularly to adhesive compositions containing waste sulfite liquor which are suitable for use in securing ceiling tiles to a ceiling.

Adhesive compositions containing concentrated waste sulfite liquor and filling materials such as clay, together with suitable plasticizers and other ingredients, have been known for various purposes, e.g. as linoleum cements. Such known adhesives are not suitable for certain uses such as for fastening ceiling tiles, such as the well-known acoustic tiles, to a ceiling, because such known adhesives lack the kind of initial "tack" or grab required for such uses, are too expensive, or are in other respects unsuitable for such purposes.

The invention accordingly has as an object to provide an adhesive containing inexpensive waste sulfite liquor solids and having qualities of viscosity, consistency, initial tack and other qualities adapting it for use as a ceiling tile adhesive.

Other and further objects, feautres and advantages of the invention will become apparent from the following disclosure of particular presently preferred embodiments thereof which are described for the purpose of disclosing the invention, but without limiting it thereto.

By waste sulfite liquor as used herein we refer to the well-known waste liquor of the sulfite process of pulp manufacture consisting mainly of salts of lignosulfonic acid dissolved in water. Such waste sulfite liquor is commercially available in concentrated form under the trademarks "Lignone," "Orzan," and "Norlig," for example.

In accordance with the invention we formulate a ceiling tile adhesive by suitably mixing, by weight, about 470 parts waste sulfite liquor solids, about 715 parts water, about 150 to 1215 parts fuller's earth, about 365 parts of a plasticizer, typically glucose, and about 70 parts lecithin. It has surprisingly been found that the inclusion of lecithin in the described composition modifies the initial "tack" or "body" of the composition so as to give the composition a rubbery quality highly desirable or essential in an adhesive which is to be used for securing ceiling tiles to a ceiling.

The invention is further disclosed by the following examples of particular embodiments thereof which are intended to be illustrative and not limiting; in nature. Throughout the application, quantities are given in parts by weight, unless otherwise indicated.

*Example 1*

The following ingredients are mixed in a heavy duty mixer:

Ingredients: Parts (pounds)
  Lignone (concentrated waste sulfite liquor, 50% solids) _____ 942
  Fuller's earth _____ 200
  Glucose (60% aqueous solution) _____ 610
  Lecithin _____ 69
  China clay _____ 1015

*Example 2*

The following ingredients are mixed in a heavy duty mixer:

Ingredients: Parts (pounds)
  Lignone (concentrated waste sulfite liquor, 50% solids) _____ 942
  Fuller's earth _____ 200
  Glucose (60% aqueous solution) _____ 610
  Lecithin _____ 69
  China clay _____ 1015
  Formaldehyde _____ 20
  Iron oxide _____ 50

*Example 3*

The following ingredients are mixed in a heavy duty mixer:

Ingredients: Parts (pounds)
  Lignone (concentrated waste sulfite liquor, liquor 50% solids) _____ 942
  Fuller's earth _____ 150
  Glucose (60% aqueous solution) _____ 610
  Lecithin _____ 69
  China clay _____ 920

*Example 4*

The following ingredients are mixed in a heavy duty mixer:

Ingredients: Parts (pounds)
  Lignone (concentrated waste sulfite liquor, liquor 50% solids) _____ 942
  Fuller's earth _____ 150
  Glucose (60% aqueous solution) _____ 610
  Lecithin _____ 69
  China clay _____ 920
  Formaldehyde _____ 20
  Iron oxide _____ 50

When used in the customary manner to secure ceiling tiles to a ceiling by "buttering" small spaced areas on the back of the tile with the composition and then pressing the tile into contact with the ceiling surface, the adhesives of the foregoing examples were found to give very highly satisfactory results.

While we prefer to employ the waste sulfite liquor as a concentrated aqueous solution, alternatively the dry solids of such a waste sulfite liquor can be mixed with an appropriate amount of water to form the waste sulfite liquor component of the adhesive.

The china clay is useful in the composition for its emulsifying effect. It may be replaced in part or entirely by fuller's earth.

The fuller's earth and the china clay serve as an inert and non combustible filling material to control the viscosity to the desired level.

The glucose desirably is added in the form of a 60% aqueous solution. Alternatively we may employ sucrose, molasses, glycerin or invert sugars, in appropriate amounts.

Those familiar with the adhesive art will understand the composition optionally may include a bactericide. The formaldehyde of Example 2 serves this purpose.

The composition may include coloring matter such as a dye or pigment in a small amount if desired. The iron oxide of Example 2 serves as a colorant.

We claim:
1. An adhesive composition consisting essentially of about 470 parts waste sulfite liquor solids, about 150 to

200 parts fuller's earth, about 365 parts glucose, about 70 parts lecithin, about 920 to 1015 parts china clay and about 715 parts water, the parts being parts by weight.

2. An adhesive composition consisting essentially of about 470 parts waste sulfite liquor solids, about 70 parts lecithin, about 150 to 1215 parts fuller's earth, about 365 parts glucose and about 715 parts water, the parts being parts by weight.

References Cited by the Examiner
UNITED STATES PATENTS

| | | | |
|---|---|---|---|
| 1,311,215 | 7/1919 | Ellis | 106—123 |
| 1,498,856 | 6/1924 | Robeson | 106—123 |

ALEXANDER H. BRODMERKEL, *Primary Examiner.*

D. J. ARNOLD, *Assistant Examiner.*